Patented Oct. 14, 1924.

1,511,472

UNITED STATES PATENT OFFICE.

JOHN JAMES HOOD, OF LONDON, JOHN CLARK, OF ESSEX, AND PERCY GEORGE CLARK, OF LONDON, ENGLAND; ROSINA BROWN QUIN ADMINISTRATRIX OF THE SAID JOHN JAMES HOOD, DECEASED.

DECOLORIZING AND PURIFICATION OF SACCHARINE MATERIALS.

No Drawing.     Application filed November 4, 1919. Serial No. 335,619.

*To all whom it may concern:*

Be it known that we, JOHN JAMES HOOD, subject of the King of Great Britain, residing at London, England, JOHN CLARK, subject of the King of Great Britain, residing at Essex, England, and PERCY GEORGE CLARK, subject of the King of Great Britain, residing at London, England, have invented new and useful Improvements in the Decolorizing and Purification of Saccharine Materials, of which the following is a specification.

The crude saccharine materials met with in commerce are generally of a deep yellow or brown colour due to objectionable ingredients, and contain also certain mineral constituents, such as salts of lime, and traces of iron.

The object of our invention is to remove these coloured constituents as well as a portion of the mineral salts present and so obtain a purer material, producing more or less decolourized saccharine substances.

The crude materials which we treat may be coloured solutions of raw cane or beet sugar in the natural state as expressed from the canes or roots; or the solutions may be prepared by dissolving these crude crystallized saccharine bodies in water; or we may employ artificially prepared glucose, such as is made by the action of acids or by other means from starchy materials, for example, maize or rice; or the crude solutions of dextrinous saccharine liquids, such as are prepared from malt.

According to this invention we effect the decolorizing and purifying of the saccharine materials by the employment of magnesium oxide produced by igniting at a dull red heat, natural mineral magnesite.

This material, previous to use as a decolorizer, is ignited at dull redness and afterwards granulated to suitable size, or it may be first granulated before heating. Or we may introduce varying amounts of carbon or carbonaceous matters to the granulated natural or artificial materials before ignition to increase the efficiency of these filtering media.

The granulated and ignited substance is, when sufficiently cooled, placed in a suitable filtering vessel of convenient size which may be either stationary or capable of being turned round an axis for the purpose of discharging the contents and it may be supplied with a steam jacket in order to keep the filtering medium as well as the solution warm during the operation.

The saccharine solution which is to be purified and decolourized is allowed to percolate slowly through the filtering medium. The effluent may be collected in separate portions according to the amount of decolourization that has been effected, and these solutions may be evaporated in the customary manner to obtain the crystallized saccharine body or only to the consistency of a syrup. With certain classes of saccharine substances we may find it advisable to add previous to filtering small quantities of salts such as nitrate or chloride of alumina or phosphate of lime or of soda or the like to the saccharine solution to increase the decolorizing efficiency of the materials. These salts have the effect of producing flocculent precipitates which aid clarifying or decolorizing the juice.

Instead of filtering the solution through the mass of purifying medium we may agitate the solution with the finely divided decolorizing material and subsequently filter off in the customary manner with filter presses.

When the efficiency of the filtering medium has become exhausted the adhering saccharine matters are washed out and the medium is discharged from the filter and ignited to a dull redness, air being excluded, and when sufficiently cooled it is replaced in the filter to be again employed in the manner already described.

What we claim is:—

1. The process of decolorizing saccharine liquid which comprises filtering it through ignited magnesite, continuing the operation until the efficiency of the filter is lowered, separating the liquid from the filter, and heating the latter out of free contact with air to render the same suitable for further use as a filler for decolorizing sugar solutions.

2. The process of decolorizing saccharine liquid which comprises filtering it through material containing ignited magnesite in the presence of carbonaceous material.

3. The process of decolorizing saccharine liquid which comprises filtering it through ignited magnesite in the presence of carbonaceous material.

4. The process of decolorizing saccharine liquid which comprises filtering it through ignited magnesite, continuing the operation until the efficiency of the filter is lowered, separating the liquid from the filter and heating the latter out of free contact with air in order that carbonaceous material may remain to render the media suitable for further use as a filter for decolorizing sugar solutions.

In testimony that we claim the foregoing as our invention we have signed our names this seventeenth day of October, 1919.

JOHN JAMES HOOD.
JOHN CLARK.
PERCY GEORGE CLARK.